US012332885B2

(12) United States Patent
Bžoch

(10) Patent No.: US 12,332,885 B2
(45) Date of Patent: Jun. 17, 2025

(54) SYSTEMS AND METHODS FOR QUERY VALIDATION AND QUERY PROCESSING

(71) Applicant: Oracle International Corporation, Redwood Shores, CA (US)

(72) Inventor: Pavel Bžoch, Prague (CZ)

(73) Assignee: Oracle International Corporation, Redwood Shores, CA (US)

( * ) Notice: Subject to any disclaimer, the term of this patent is extended or adjusted under 35 U.S.C. 154(b) by 61 days.

(21) Appl. No.: 17/938,574

(22) Filed: Oct. 6, 2022

(65) Prior Publication Data

US 2024/0119049 A1 Apr. 11, 2024

(51) Int. Cl.
*G06F 16/2453* (2019.01)

(52) U.S. Cl.
CPC .. *G06F 16/24537* (2019.01); *G06F 16/24542* (2019.01)

(58) Field of Classification Search
CPC ..................... G06F 16/24537; G06F 16/24542
See application file for complete search history.

(56) References Cited

U.S. PATENT DOCUMENTS

| | | | |
|---|---|---|---|
| 7,016,915 B2 | 3/2006 | Shanmugasundaram et al. | |
| 8,301,668 B1* | 10/2012 | He | G06F 16/242 |
| | | | 707/804 |
| 8,782,744 B1* | 7/2014 | Fuller | G06F 21/629 |
| | | | 709/225 |
| 9,672,247 B2 | 6/2017 | Shankar et al. | |
| 11,023,461 B2 | 6/2021 | Rumiantsau et al. | |
| 11,567,735 B1* | 1/2023 | Kulkarni | G06F 16/24537 |
| 2007/0083853 A1* | 4/2007 | Cook | G06F 8/38 |
| | | | 715/764 |
| 2012/0079464 A1* | 3/2012 | De Smet | G06F 16/2452 |
| | | | 717/143 |

(Continued)

FOREIGN PATENT DOCUMENTS

CN 105404665 A 3/2016

OTHER PUBLICATIONS

"Convert Mongodb Query Into Spring Mongodb Syntax", Blog, ADocLib, retrieved online on Oct. 5, 2022 at URL: https://www.adoclib.com/blog/convert-mongodb-query-into-spring-mongodb-syntax.html.

(Continued)

*Primary Examiner* — Charles D Adams
(74) *Attorney, Agent, or Firm* — MUGHAL GAUDRY & FRANKLIN PC

(57) ABSTRACT

A computer-implemented method includes receiving a text input string defining components of a select query in a first representation and parsing the text input string to identify a set of key-value pairs that define portions of a where clause. The method also includes identifying an operator for the first key-value pair, determining a data type of the first operand value, comparing the operator with a predefined set of eligible operators, and comparing the data type of the first operand value with the data type of the first property. The method further includes transmitting a rejection message without submitting a query command to the query processor of the database when, based on the comparisons, one or more of (i) the operator is not within the predefined set of eligible operators and (ii) the data type of the first operand value does not match the data type of the first property.

20 Claims, 6 Drawing Sheets

(56) References Cited

U.S. PATENT DOCUMENTS

| | | |
|---|---|---|
| 2017/0091265 A1 | 3/2017 | Cao et al. |
| 2021/0034615 A1 | 2/2021 | Chen et al. |
| 2024/0020302 A1* | 1/2024 | Minborg ............. G06F 16/2448 |

OTHER PUBLICATIONS

"Convert MongoDB query into Spring MongoDB syntax", Webpage, Stack Overflow, dated Mar. 1, 2019, retrieved online on Mar. 11, 2022 at URL: https://stackoverflow.com/questions/54951167/convert-mongodb-query-into-spring-mongodb-syntax.

"Creating and validating JSON queries for the getRecordListForTableWithQuery operation", Web Article, Helix ALM, 2 pages, retrieved online on Mar. 11, 2022 at URL: https://help.perforce.com/helix-alm/helixalm/2020.1.0/sdk/Content/SDK/CreatingAndValidatingJSONQueries.htm.

"mongodb-query-parser", Web Article, npm, Inc., retreived online retrieved online on Mar. 11, 2022 at URL: https://www.hpmjs.com/package/mongodb-query-parser.

"Validate a mongodb query syntax programmatically", Webpage, Stack Overflow, dated Mar. 18, 2018, 2 pages, retrieved online on Mar. 11, 2022 at URL: https://stackoverflow.com/questions/49332983/validate-a-mongodb-query-syntax-programmatically.

Bahta et al., "Translating JSON Data into Relational Data Using Schema-oblivious Approaches", Conference Paper, 2019 ACM Southeast Conference, Apr. 18-20, 2019, Kennesaw, GA, USA, DOI:10.1145/3299815.3314467.

Brahmia et al., "τJSchema: A Framework for Managing Temporal JSON-Based NoSQL Databases", International Conference on Database and Expert Systems Applications, Sep. 2016, LNCS 9828, pp. 167-181, DOI:10.1007/978-3-319-44406-2_13.

Debnath, "How to Manage Data Persistence with MongoDB and JPA", Web Post, Developer.com, dated Apr. 4, 2016, 12 pages, retrieved online from URL: https://www.developer.com/database/how-to-manage-data-persistence-with-mongodb-and-jpa/.

Hewedy, "Using MongoDB query syntax to query Relational Database in Java", Web Post, dated Mar. 27, 2021, 3 pages, retrieved online at URL: https://dev.to/mhewedy/using-mongodb-query-syntax-to-query-relational-database-in-lava-49hf.

Kathiriya, "An Overview of MongoDB Schema Validation", Web Article, Several 9s, dated Jun. 17, 2019, 6 pages, accessed online at URL: https://severalnines.com/database-blog/overview-mongodb-schema-validation.

Pezoa, "Foundations of JSON Schema", WWW '16: Proceedings of the 25th International Conference on World Wide Web, Apr. 2016, pp. 263-273, DOI: https://doi.org/10.1145/2872427.2883029.

* cited by examiner

SYSTEMS AND METHODS FOR QUERY VALIDATION AND QUERY PROCESSING

TECHNICAL FIELD

The field of disclosure relates generally to electronic database management and, more particularly, to database query validation and query processing.

BACKGROUND

Databases can be logically modeled using structured data, unstructured data, or semi-structured data. Structured data includes data objects that have a defined data type, such as integer, float, string, date, or the like. In a relational database, such structured data is typically described in the form of a table structure, where each field (e.g., column) in the table has a pre-defined data type. For example, an employee table may store structured data on employees of a company, such as first and last names (string), salary (float), date of hire (date), and number of years employed (integer). Unstructured data includes data objects that do not have a pre-defined structure. For example, a library database may store book content, web publication content, video content, or the like, each of which may have formats of differing structure. Semi-structured data is a hybrid of the two data models that includes some structured data objects and some unstructured data objects. For example, an emails database may store some structured content, such as recipient email addresses (string), subject line (string), date sent (date), as well as some unstructured content, such as email body content (e.g., text, html, or the like) or attachments (e.g., video files, PDF files, or the like).

Relational databases are commonly used to store structured data. In such databases, SQL ("Structured Query Language") is typically used for querying data from such databases. The format of SQL queries or other operations allows the user to provide a "where" clause as a predicate to the operation that are used to identify limitations on the data operated on within database. To store unstructured data, document oriented databases have been developed (e.g., NoSQL databases). One such example is MongoDB, made publicly available by MongoDB Inc. of Palo Alto, CA. MongoDB stores data in JSON (JavaScript Object Notation) format, which is an open standard file format that uses attribute-value pairs for defining data objects. MongoDB also defines a query language to retrieve selected documents, and that query language is also defined in JSON format.

In some instances, aspects of query submissions may contain errors such as incorrect names of data objects (e.g., database field), names of unpermissioned data objects, or mismatched operators or operands for data type of the referenced data object. Conventional query processing typically involves the database management software receiving, parsing, and executing submitted database queries. However, if any such errors are present in the query submission, the database management software wastes processing resources by attempting to perform the erroneous query. A system and method is needed for verifying integrity of queries prior to submission to the database query processor.

SUMMARY

In one aspect, a database management system is provided. The database management system includes a memory storing a database that includes at least a structured component. The structured component defines at least a field name and a data type for each data field defined by the structured component. The database management system also includes a query processor configured to generate query output from a database in response to query commands formatted in a native query syntax. The database management system further includes a query validator comprising at least one processor executing instructions that are configured to cause the at least one processor to: receive, from a requesting device, a text input string defining components of a select query for the database in a first representation, the first representation being different than a native query syntax of the database; parse, from the text input string, a set of key-value pairs that define search filter conditions of the select query, the set of key-value pairs includes a first key-value pair, the first key-value pair includes at least a first property and a first operand value; identify an operator associated with the first key-value pair; determine a data type of the first operand value; compare the operator with a predefined set of eligible operators defined for a data type of the first property; compare the data type of the first operand value with the data type of the first property; and transmit a rejection message to the requesting device without submitting a query command to the query processor of the database for the select query when one or more of (i) the operator is not within the predefined set of eligible operators and (ii) the data type of the first operand value does not match the data type of the first property.

In another aspect, a computer-implemented method is provided. The computer-implemented method includes receiving a text input string defining components of a select query for a database in a first representation, the first representation being different than a query syntax of a query processor associated with the database. The computer-implemented method also includes parsing the text input string to identify a set of key-value pairs that define portions of a where clause for the select query, the set of key-value pairs includes a first key-value pair, the first key-value pair includes at least a first property and a first operand value. The computer-implemented method further includes identifying an operator associated with the first key-value pair. The computer-implemented method also includes determining a data type of the first operand value. The computer-implemented method further includes comparing the operator with a predefined set of eligible operators defined for a data type of the first property. The computer-implemented method also includes comparing the data type of the first operand value with the data type of the first property. The computer-implemented method further includes transmitting a rejection message to a requesting device without submitting a query command to the query processor of the database for the select query when, based on the comparisons, one or more of (i) the operator is not within the predefined set of eligible operators and (ii) the data type of the first operand value does not match the data type of the first property.

In yet another aspect, a non-transitory, computer-readable medium storing instructions is provided. When executed by at least one processor, the instructions cause the at least one processor to: receive, from a requesting device, a text input string defining components of a select query for a database in a first representation, the first representation being different than a native query syntax of the database; parse, from the text input string, a set of key-value pairs that define search filter conditions of the select query, the set of key-value pairs includes a first key-value pair, the first key-value pair includes at least a first property and a first operand value; identify an operator associated with the first key-value pair; determine a data type of the first operand value; compare the operator with a predefined set of eligible operators defined for a data type of the first property; compare the data type of the first operand value with the data type of the first property; and transmit a rejection message to the requesting device without submitting a query command to a query processor of the database for the select query when one or more of (i) the operator is not within the predefined set of eligible operators and (ii) the data type of the first operand value does not match the data type of the first property.

DETAILED DESCRIPTION

Figure 1:
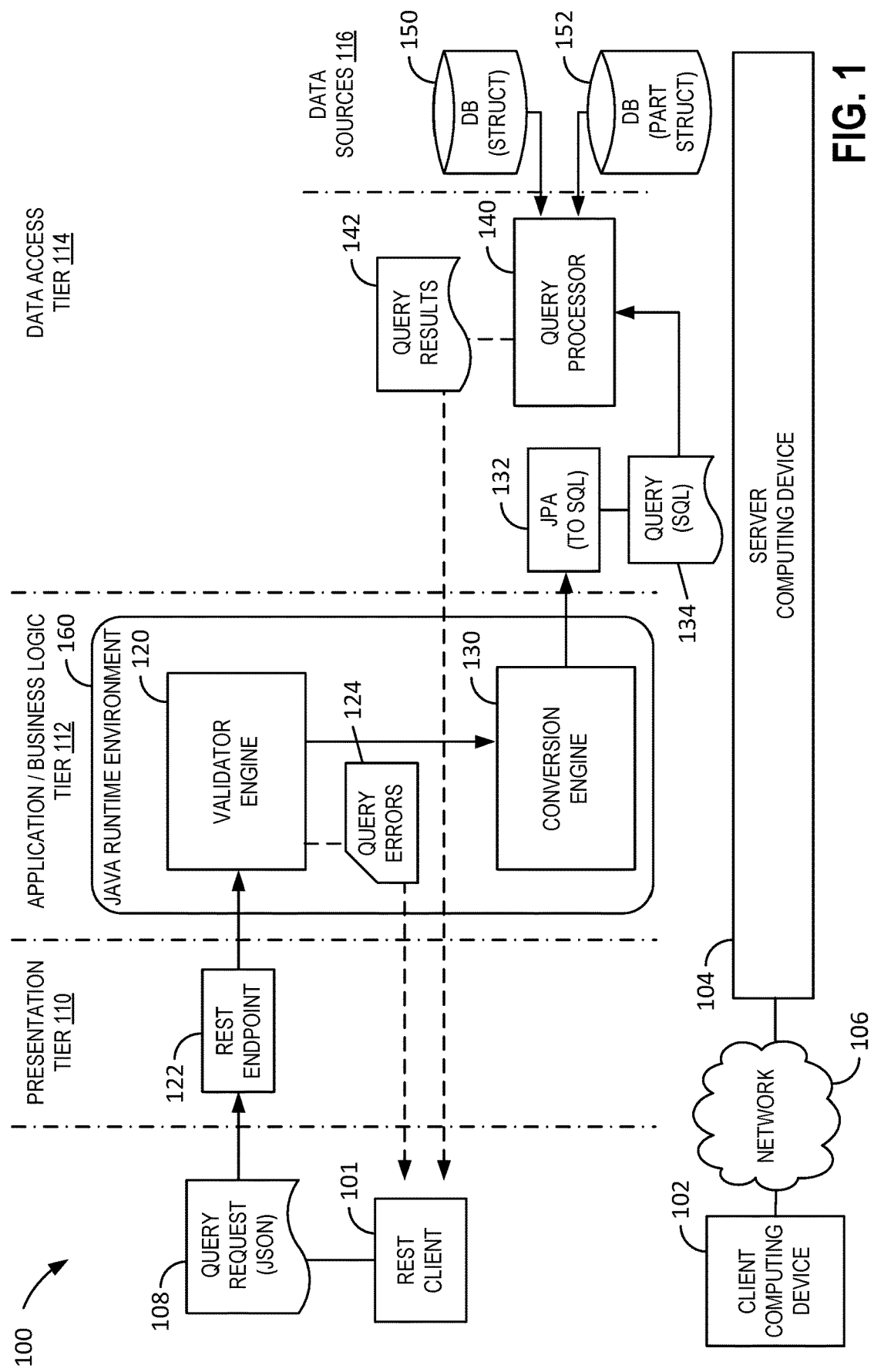
FIG. 1 is an architecture diagram of an example query preprocessing system in accordance with the present disclosure.

In the following description, for the purposes of explanation, numerous specific details are set forth in order to provide a thorough understanding of the disclosure. One or more embodiments may be practiced without these specific details. Features described in one embodiment may be combined with features described in a different embodiment. In some examples, well-known structures and devices are described with reference to a block diagram form in order to avoid unnecessarily obscuring the present disclosure.

1. General Overview

A query preprocessing system is described herein that provides various technical benefits to database management systems. In an example embodiment, the query preprocessing system includes a validator engine that is configured to analyze aspects of a database query prior to submission to a backend database management system. The database management system provides structured or partially structured databases that include one or more data objects (e.g., fields, columns of a database table) that have predefined data types. The incoming query is initially received (e.g., from a client device) with parameters of a "where" clause provided in JSON format (a "JSON query"). The parameters of the "where" clause are provided as JSON key-value pairs, where a key identifies a particular data object (e.g., a field name from the structured portion of the database) and the value provides limitation parameters to be provided for that particular data object during the search.

The validator engine is configured to analyze several aspects of each portion of the "where" clause. First, the validator engine extracts a name of a data object (e.g., a data object identifier or "property") from a key-value pair and verifies that the property matches a field of a target database. Next, the validator engine identifies a data type associated with that data object and a comparison operator for this key-value pair. The data type is used to verify that the operand value given for the key-value pair is of a proper data type (e.g., the value is an integer when the associated data object is of type integer), and that the comparison operator used for this key-value pair is a legitimate comparison operator for this data type (e.g., a numerical comparison operator is used when the data object is a numerical data type, such as integer, float, or the like). If any of the key-value pairs is determined to be erroneous, the validator engine generates an error message that identifies which key-value pair has an error and the type of error that is detected. As such, the validator engine is able to identify certain types of errors for structured portions of a query and return error information to the submitting client prior to submission of the query to the backend query processor for the database, thereby working as a pre-processor for the query.

In an example embodiment, the validator engine uses Java annotations and reflection (e.g., in Java Bean Validation framework 2.0, JSR 380) to perform this error checking. More specifically, the query preprocessing system establishes a Java runtime environment in which Java constraint annotations and associated validators are defined and used to detect these errors at runtime. The use of this validation framework allows users to centralize validation in one place (e.g., via metadata in the form of constraints added to Java domain classes or via XML descriptors) rather than duplicating their validation code in each layer of their application.

Further, the query preprocessing system also includes a conversion engine that converts the JSON-formatted query into an SQL query for submission to the query processor of the backend database. More specifically, the conversion engine uses Jakarta Persistence API ("JPA", also known as Java Persistence API) to work with structured data in Java. JPA defines a Jakarta Persistence Query Language ("JPQL", also known as Java Persistence Query Language) and metadata about the objects and relations. The conversion engine converts the JSON-formatted query into a JPA predicate using JPA Criteria builder. This predicate is then used to create a query for submission to the database in the final SQL query format.

One or more embodiments described in this Specification and/or recited in the claims may not be included in this General Overview section, but these embodiments are still covered by this disclosure.

2. System Architecture

FIG. 1 is an architecture diagram of an example query preprocessing system 100 in accordance with the present disclosure. In the example embodiment, the query preprocessing system 100 receives a query request 108 generated by a client computing device 102 that is in networked communication with a server computing device 104 via a network 106, such as the Internet. The client computing device 102 and server computing device 104 include conventional computing components not separately shown, such as central processing units (CPUs), transient memory devices (e.g., random access memory), persistent memory devices (e.g., disk drives or the like), network interface devices, display devices, and the like. While a simple client/server architecture is depicted here in FIG. 1, with a single client computing device 102 and a single server computing device 104, with a three-tier architecture that includes a presentation tier 110, an application tier 112, and a data access tier 114, each executing on the server computing device 104, it should be understood that other architectures and frameworks are possible, and that these methods may be interchangeably performed by any suitable computing device or in any suitable architecture sufficient to perform the operations described herein (e.g., cloud computing environments, virtual machines, server clustering, or the like).

In the example embodiment, the query preprocessing system 100 performs various pre-processing operations on the query request 108 prior to submitting an SQL query 134 to a query processor 140 of a relational database management system ("RDBMS") provided by the server computing device 104. The query preprocessing system 100 includes a validator engine 120 and a conversion engine 130 that share a java runtime environment 160 through which the preprocessing operations described herein are performed. The validator engine 120 is configured to parse the query request 108 and analyze aspects of the request 108 for particular errors. The conversion engine 130 is configured to convert the query request 108 into an SQL query sufficient for submission to the query processor 140.

The query request 108, in the example embodiment, is initially generated by a representational state transfer ("REST") client 101 in JSON format. JSON is a text-based data format that provides data components in key-value pairs. The validator engine 120 exposes a REST endpoint 122 that acts as an API for submission of query requests 108 from other applications. The data provided in the query request 108, in the examples described herein, includes components of a "where" clause intended as a restricting predicate of a select statement for requesting structured data from a database, such as structured database 150 or partially structured database 152 managed by the server 104 or the RDBMS. For example, an excerpt of a simple query in JSON notation is:

```
{
    "name" : "John Smith",
    "age" : {
        "$gt" : 40
    }
}
```

Example 1—Simple JSON Text

The above Example 1 query includes two comma-separated, colon-delimited key-value pairs where the key is a data object identifier, or property (e.g., a column name of a database table), and where the value is either an operand value for that key or a nested key-value pair that identifies an operator and the operand value. For example, the first key-value pair includes a property of "name" and a value of "John Smith". Without an express operator provided in a given key-value pair, the operator is inferred to be "equal to". As such, this first key-value pair means that this query 108 is requesting data (e.g., all rows) from the target database where the "name" field is equal to "John Smith". In addition, the second key-value pair includes a property of "age" and a nested key-value pair that identifies an operator of "$gt" (e.g., "greater than") and a value of 40. Since this second key-value pair expressly identifies a particular operator, then this second key-value pair adds an additional limitation to the query, requesting also that the data from the target database only include rows where the "age" is greater than 40. Additional details with respect to JSON formatting and additional details are described in greater detail below.

While the term "key-value pairs" is used in some contexts herein, it should be understood that some key-value pairs refer to a particular property and associated value, but that these key-value pairs may be expanded to include an operator, either expressly (e.g., via a nested key-value pair) or implied (e.g., presumed as "equal to" when no operator is expressly provided). Such key-value pairs may be referred to herein as "triplets", inasmuch as they include a resource, an operator (express or implied), and an operand value (e.g., resource="age", operator=">" or "greater than", and operand value=40).

During operation, the validator engine 120 receives the JSON query 108 via the REST endpoint 122 and parses the JSON text into distinct triplets (e.g., resource, operator, operand value). The validator engine 120 then inspect each of those triplets for particular errors. More specifically, in the example embodiment, the validator engine 120 identifies three types of errors in any given triplet: (1) an error with the property identified by the triplet (e.g., a non-existent or restricted data field); (2) an error with the operator of the triplet (e.g., a mismatch between the type of operator and the data type of the property); and (3) an error with the operand value of the triplet (e.g., a mismatch between the data type of the operand value and the data type of the property). If any errors are detected, the validator engine 120 returns a query error message 124 to the requesting computing device or application that includes error information (e.g., codes, error text, or the like) such as which triplet has an error, the type of error detected, a description of the error condition, or the like. In some embodiments, the validator engine 120 includes an option (e.g., a setting, a query request switch, or the like) to perform validation of the JSON query 108 without proceeding to execution (e.g., as a developers test). As such, the validator engine 120 may return the query error message 124 when query errors are detected or a success message (not separately shown) back to the REST client 101 when no query errors are detected.

In the example embodiment, when analysis of the query request 108 is error free, then the query preprocessing system 100 prepares the query for submission and execution. More specifically, the validator engine 120 invokes the conversion engine 130 to convert this query into a form sufficient for execution by the query processor 140 of the backend database system. The conversion engine 130, in the example embodiment, converts the JSON-formatted query into a JPA predicate using JPA 132 criteria builder. This predicate is then used to create an SQL query 134 for submission to the database in the final SQL query format.

Included in the query processing of the JSON-formatted query 108, the query preprocessing system 100 uses a grammar for the deserialization of the JSON-formatted query 108 that defines all of the various components of a query. These various components are represented in the Java runtime environment 160 as classes to store criterions, classes to store properties (e.g., fields), classes to store operators (e.g., comparison operators, logical operators, or the like), and classes to store expressions (e.g., numerical comparisons, string comparisons, Boolean comparisons, and the like). The JSON query 108 supports Boolean, number, string, object, and array values. To perform deserialization, the conversion engine 130 performs recursive descent parsing that creates objects of criterions and expressions. Once the JSON query 108 is parsed, the conversion engine 130 converts the query 108 into a JPA predicate, which is then passed to a where method in the CriteriaQuery of JPA 132. Based on this predicate, the conversion engine 130 uses JPA 132 to generate the SQL-formatted query 134 that is passed to the query processor 140 for processing. Upon processing of the query, any query results 142 are passed back to the requesting device or application.

The term "source operation" may be used herein to refer to the query request 108. The source operation may cause the execution of one or more destination operations. The term "destination operation" may be used herein to refer to the SQL query 134. In some embodiments, a single query request 108 may cause the execution of a single SQL query 134. In some embodiments, a single query request 108 may cause the execution of multiple destination operations (e.g., multiple SQL query requests 134 that are used to satisfy the one query request 108). In such situations, the source operation and the multiple destination operations are semantically equivalent, in that they achieve the same output, but they differ in that they result in different sub-operations to achieve the same output.

By use of the conversion engine 130 and JPA 132, the query preprocessing system 100 avoids generating SQL for the query directly, thereby avoiding exposing usage of SQL directly to the requesting device, and the associated potential security vulnerabilities that this exposure may entail (e.g., SQL injection). Since the JSON query 108 is not directly SQL based, security vulnerabilities are minimized. Further, usage of Java objects allows use of visitor design patterns, converting from Java objects describing the original JSON query 108 to a JPA predicate, and then to the SQL query 134.

It should be understood that only some components of an RDBMS, such as query processor 140 and databases 150, 152, are shown here for purposes of brevity, but that other components of the RDBMS may be included in the query preprocessing system 100.

Various aspects of functionality associated with the query preprocessing system 100 and associated operations of the validator engine 120 and conversion engine 130 are described and illustrated in greater detail below.

3. Application Process Overview—Validation

Figure 2:
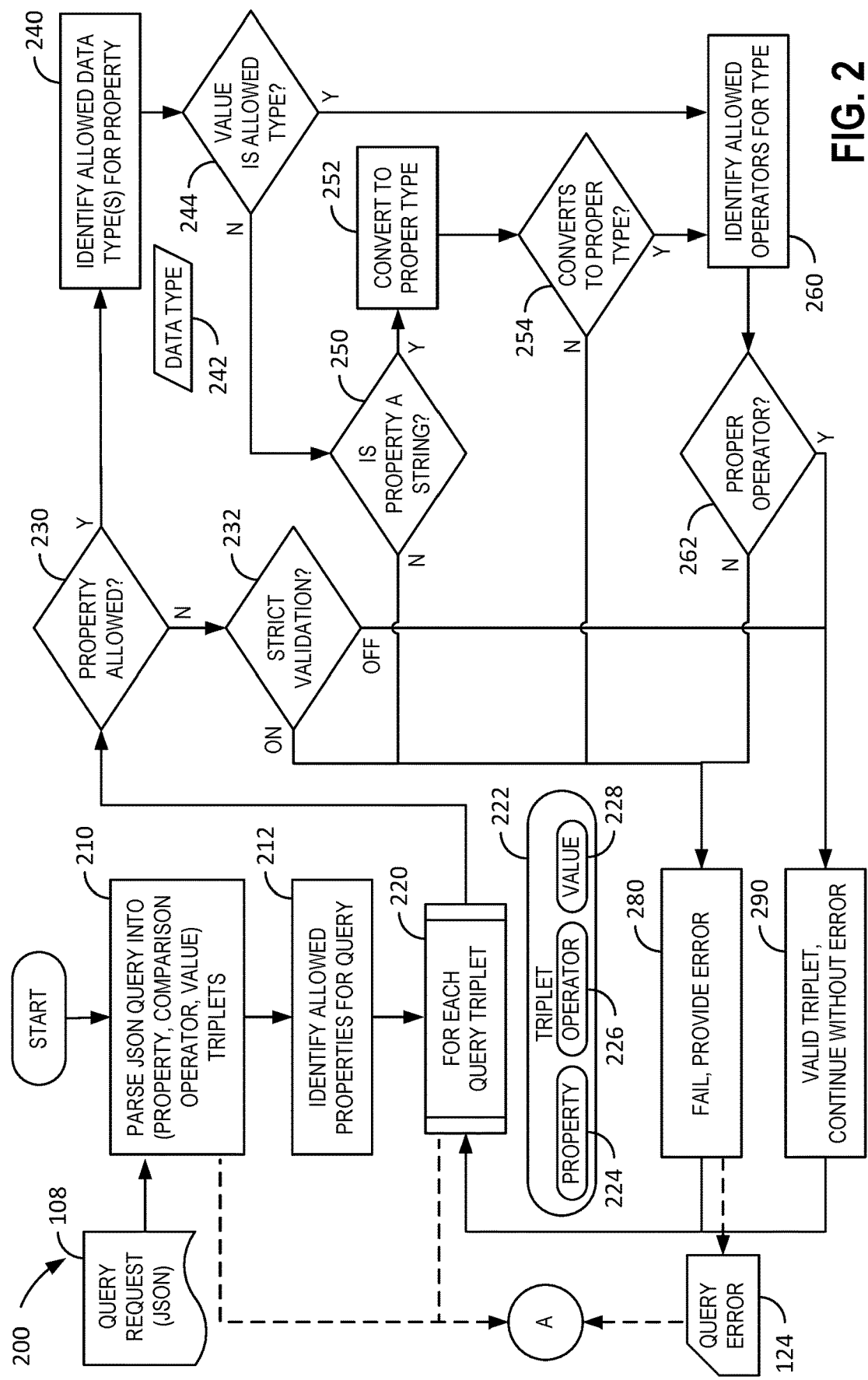
FIG. 2 is a flow chart illustrating an example method for performing validation (e.g., error checking) on the query request shown in FIG. 1.

FIG. 2 is a flow chart illustrating an example method 200 for performing validation (e.g., error checking) on the query request 108 shown in FIG. 1. In the example embodiment, the method 200 is performed by the validator engine 120 on the client computing device 102, and may be performed within the Java runtime environment 160. In other embodiments, the method 200 may instead be performed by the server computing device 104 of FIG. 1. At operation 210, the validator engine 120 receives the query request 108 which, as discussed above, includes a JSON-formatted text component that represents parameters of a "where" clause for a database search. It is presumed, for purposes of these examples, that a target database is otherwise identified for this query 108 and that other parameters for the query 108 may be included in the query request 108 but are excluded from the examples described herein for purposes of clarity and focus.

The JSON text of the query request 108 is a colon-delimited, comma-separated list of where clause parameters that include various components such as properties, operators, operand values, expression formats, and the like. In the example embodiment, the validator engine 120 and the conversion engine 130 use a grammar to parse the JSON text as shown here in Table 1:

TABLE 1

Parser Grammar

PROPERTY := PROPERTY | PROPERTY.KEY
LOGICAL_OPERATOR := $and, $or, $nor
SINGLE_VAL_OPERATOR := $eq, $ne, $gt, $gte, $lt, $lte
ARRAY_VAL_OPERATOR := $in, $nin
OPERATOR_EXPRESSION := "SINGLE_VAL_OPERATOR" : value
   | "ARRAY_VAL_OPERATOR" : [value1, value2, ..., valueN]
SHORT_EXPRESSION := "PROPERTY" : value
FULL_EXPRESSION := "PROPERTY" : {OPERATOR_EXPRESSION}
FULL_EXPRESSION_MORE_OPERATORS : "PROPERTY" :
   {OPERATOR_EXPRESSION_1, ..., OPERATOR_EXPRESSION_N}
NOT_EXPRESSION:="PROPERTY" : {"$not": {"ARRAY_VAL_OPERATOR":value}}
   | "FIELD": {"$not": {ARRAY_VAL_OPERATOR":[value1, ..., valueN]}}
ROOT_EXPRESSION := SHORT_EXPRESSION
   | FULL_EXPRESSION
   | FULL_EXPRESSION_MORE_OPERATORS
   | NOT_EXPRESSION
EXPRESSION := SHORT_EXPRESSION
   | FULL_EXPRESSION
   | NOT_EXPRESSION
CRITERION := EXPRESSION,
   | "LOGICAL_OPERATOR" : [List+<{CRITERION}>}
ROOT_CRITERION := end
   | ROOT_CRITERION
   | ROOT_EXPRESSION
   | "LOGICAL_OPERATOR" : [List+{CRITERION}>]

In the example embodiment, the validator engine 120 uses the grammar of Table 1 to perform recursive descent parsing to define all ROOT EXPRESSION and EXPRESSION definitions from the JSON text. This parsing identifies one or more triplets comprising (property, comparison operator, operand value) for each expression, where the property is PROPERTY, the operator is one of SINGLE_VAL_OPERATOR or ARRAY_VAL_OPERATOR, and the operand value is represented as value or an array of [value], . . . , valueN. It should be noted that, in this grammar, the operator of "equal to" or "$eq" is implied in expressions when no operator is expressly provided. For example, a SHORT EXPRESSION includes only "PROPERTY" and value, and the operator "equal to" or "$eq" is implied for these SHORT EXPRESSIONs. Further, it should be noted that, in this grammar, expressions not expressly separated by another LOGICAL_OPERATOR are presumed to be separated by an "and" or "$and" logical operator.

Consider the following example JSON text of a query request 108:

```
{
    "sex" : "MALE",
    "actualZone" : "Europe/Prague",
    "$or" : [
        {
            "actualProject.name" : {
                "$in" : [
                    "my prj"
                ]
            }
        },
        {
            "salary" : {
                "$gt" : 1000
            }
        },
        {
            "workingRemote" : true
        }
    ]
}
```

Example 2—Complex JSON Text

This Example 2 parses out to five different triplets, to each of five different properties, namely: "sex", "actualZone", "actualProject.name", "salary", and "workingRemote". For purposes of discussion, these five triplets and their associated expressions are identified herein as E1, E2, E3, E4, and E5, respectively.

For the "sex" property (E1), the operand value is "MALE" (in the form of a string operand) and, since no operator is expressly provided, the operator is implied as "equal to" (e.g., where sex="MALE"). Similarly, the "actualZone" property (E2) has an operand value of "Europe/Prague" (another string operand), with an implied operator of "equal to" (e.g., where actualZone="Europe/Prague"). Further, since these two expressions are not expressly separated by a logical operator, an "and" is presumed to be between the two expressions (e.g., E1 and E2, or where sex="MALE" and where actualZone="Europe/Prague"). The "actualProject.name" property (E3) includes a nested array operator, "$in" or "in", and a bracketed array that includes only one element, "my prj" (string) (e.g., where actualProject.name in ["my prj"]). The "salary" property (E4) includes a nested operator "$gt" or "greater than", and an operand value of 1000 (integer) (e.g., where salary>1000). The "workingRemote" property (E5) has an operand value of true (boolean), with an implied operator of "equal to" (e.g., where workingRemote=true). It should also be noted that the expressions E3, E4, and E5 are each separated by an implied "and". Further, they are also preceded by a logical operator "$or" or a "or", and these three expressions are included as an array of key-value pairs. As such, parsing of the JSON text at operation 210 yields five triplets associated with the five expressions E1-E5, and the proper parsing of this Example 2 JSON text yields an effective where clause of "where E1 and E2 or (E3 and E4 and E5)".

At operation 212, in the example embodiment, the validator engine 120 identifies a set of allowed properties for this query 108. For example, the validator engine 120 may be pre-configured with a set of fields or columns of structured data from the target database. These allowed properties, for example, may be all of the structured data fields of the target database, or may be all of the structured data fields of the target database for which the submitter of the query 108 is permissioned to access. As such, these allowed properties represent the set of eligible properties that may be legitimately included as identified properties in the JSON query request 108.

In the example embodiment, at loop operation 220, the validator engine 120 loops through each of the triplets identified in operation 210 to perform error checking for each triplet (property, operator, operand value). More specifically, during each loop iteration, the validator engine 120 inspects one of the triplets 222 for errors, where each individual triplet 222 includes a property 224, an operator 226, and an operand value (or just "value") 228. At test 230, the validator engine 120 test to see whether the property 224 of the current triplet 222 is within the set of allowed properties identified in operation 212. If the property 224 is not in the set of allowed properties at test 230, then this iteration determines whether strict validation is enabled at test 232. Strict validation is a Boolean setting that controls whether or not an error is generated when an unknown or otherwise invalid property name is provided. If strict validation is set to ON, then an error is generated for this triplet at operation 280 based on the unknown property 224 for this iteration. Otherwise, if strict validation is OFF, then no error is generated and the current triplet 222 is considered valid at operation 290 and the loop 220 continues to the next triplet 222.

Returning back to test 230, if the current property 224 is allowed, then no error in the property is generated and the validator engine 120 continues to operation 240. At operation 240, the validator engine 120 identifies one or more allowed data type(s) for the current property 224. In the example embodiment, each allowed property is pre-configured with at least one allowed data type 242 (e.g., based on the underlying field or column in the structured database 150, 152). Data type(s) 242 may include, for example, numerical data types (e.g., integer, float, binary, Boolean, or the like), string data types (e.g., char, varchar, or the like), date data types (e.g., date, timestamp, or the like), null data type, or other structured data types. The allowed data type is used for checking both the operator 226 and the operand value 228 of this triplet 222. By way of example, presume that, for Example 2, the underlying data types for fields "sex", "actualZone", and "actualProject.name", are CHAR (e.g., string) data type, "salary" is integer data type, and "workingRemote" is Boolean data type for the target database.

At test 244, the validator engine 120 checks to see whether the operand value 228 is one of the allowed types 242 of the underlying database field. For example, for the "salary" triplet E4, the allowed type 242 is an integer data type and the data type of operand value 228 (1000) is an integer. As such, the example E4 satisfies test 244. If, at test 244, the data type of the operand value 228 does not match the allowed type 242, then the validator engine 120 checks to see if the mismatched operand value 228 is a string. It is possible that a string may be substituted for various data types (e.g., if the value within quotes can be evaluated as the appropriate data type). For example, if the operand value 228 of the E4 triplet was provided as the string "1,000" rather than the integer 1000, then the validator engine 120 may interpret this string as an integer (e.g., because the contents of the string is a valid integer). As such, at test 250, if the operand value 228 is a string data type, then the validator engine 120 evaluates the contents of the operand value 228 to see if the contents can be converted to the allowed data type 242 at operation 252. If the operand value 228 does not convert to the allowed data type 242 at test 254, then this triplet 222 fails and an error is generated for this triplet 222 at operation 280. If the operand value 228 does convert to the allowed data type 242 at test 254, or if the operand value 228 already matches the allowed type 242 at test 244, then the validator engine 120 continues to operation 260.

At operation 260, the validator engine 120 identifies a set of allowed operators for the data type 242. In the example embodiment, the validator engine 120 is configured with sets of allowed operators for each particular data type 242 or sets of data types. For example, and as shown in the SINGLE_VAL_OPERATOR of the grammar of Table 1, valid operators for numeric data types include "equal to" ($eq), "not equal to" ($ne), "greater than" ($gt), "greater than or equal to" ($gte), "less than" ($lt), or "less than or equal to" ($lte). At test 262, the validator engine 120 evaluates whether the operator 226 of the current triplet 222 is one of the valid operators for the data type 242 of the underlying field. If the operator 226 is not a valid operator for the data type 242, then the validator engine 120 generates an error for this triplet 222 at operation 280. Otherwise, if the operator 226 is a valid operator for the data type 242, then no error is generated and the current triplet 222 is considered valid at operation 290 and the loop 220 continues to the next triplet 222.

4. Validation Details

Figure 3:
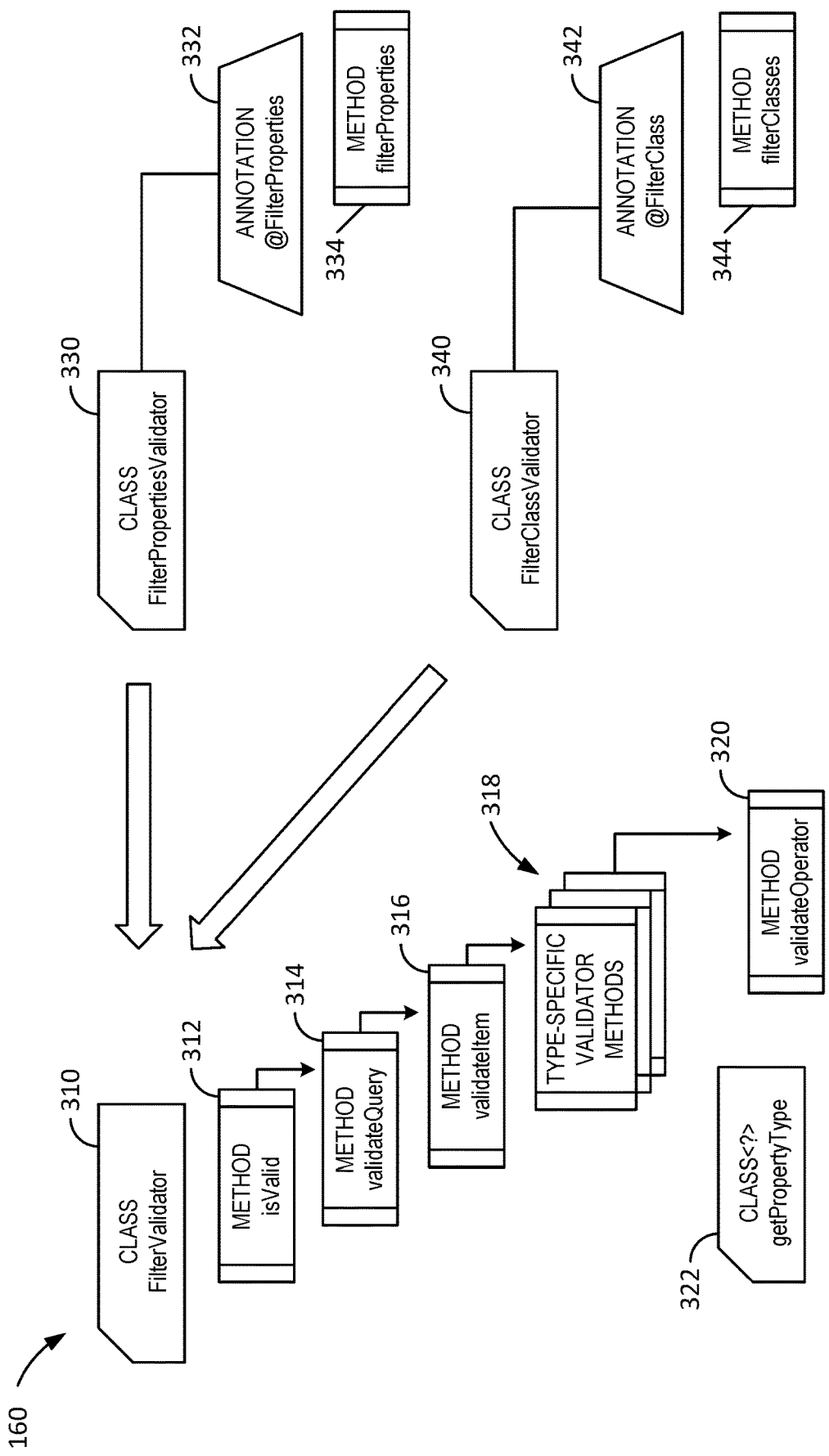
FIG. 3 is a component diagram of the java runtime environment of FIG. 1 in which the validator engine performs the validation method of FIG. 2.

FIG. 3 is a component diagram of the Java runtime environment 160 of FIG. 1 in which the validator engine 120 performs the validation method 200 of FIG. 2. In the example embodiment, the validation method 200 is implemented using Java Bean Validation framework 2.0 (Java Specification Request ("JSR") 380). In conventional systems, developers usually duplicate their validation code in each layer of their application. The present validation framework allows programmers to perform validation in one place via metadata (e.g., constraints) added to Java domain classes. The metadata source used in the present framework is Java annotations added to various targets. Adding constraint annotations allows this framework to perform "programming by contract" by validating the contract of the method (e.g., pre- and post-conditions).

In the example embodiment, constraints have two parts: a constraint annotation and a collection of validators implemented for the constraint. Constraint annotation is configured as runtime annotations that are annotated with @javax.validation.Constraint annotation. For example:

TABLE 2

Example Constraint Definition

@Target({ElementType.FIELD, ElementType.METHOD, ElementType.TYPE})
@Retention(RetentionPolicy.RUNTIME)
@Constraint(validatedBy = MyConstraintValidator.class)
public @interface MyConstraint {
  String message( ) default { };
  Class<?>[ ] groups() default { };
  Class<? extends Payload>[ ] payload( ) default { };
  Integer myValue( );
}

Within @java.validation.Constraint annotation, an array of validators are set. Generic constraint annotation can be targeted to, for example, FIELD, METHOD, CONSTRUCTOR, PARAMETER TYPE, ANNOTATION_TYPE, and TYPE_USE. Each constraint annotation definition contains fields for message, groups, and payload. Additionally, any other fields can be added to provide information or settings for validation. The message field is used to create an error message, such as the query errors 124 of operation 280 (shown in FIG. 2). The framework also supports interpolation of the messages. The groups field defines group(s) to which the constraint belongs. If no group is defined, the constraint automatically belongs to the default group. The payload specifies another data with which the constraint is associated. The payload is usually configured to associate the severity to the constraint.

The constraint validator is a Java class that defines which type it validates. The validator class implements javax.validation.ConstraintValidator <ConstraintAnnotation, TargetClass>. For example:

TABLE 3

Example Constraint Validator public class MyConstraintValidator
  implements ConstraintValidator<MyConstraint, MyObject> {
  @Override
  public void initialize(MyConstraint constraintAnnotation) {
    // initialization of the validator
  }
  @Override
  public boolean isValid(MyObject value,
    Constraint ValidatorContext context) {
    // user defined validation code
    return true;
  }
}

Before the JSON text of the query request 108 can be validated, the validator engine 120 establishes structures for data that can be used in the query 108. In establishing the java runtime environment 160, the validator engine 120 establishes a list of available properties that can be used in the query 108 (e.g., as in operation 212 of FIG. 2) and data types of these properties (e.g., as used in operation 240 of FIG. 2). More specifically, the Java runtime environment 160 and the validator engine 120 is preconfigured with two constraint annotations, @QueryFilterProperties and @QueryFilterClass.

In the example framework shown in FIG. 3, the validator engine 120 provides a Java class, FilterValidator 310:
  public abstract class FilterValidator<A extends Annotation>
  implements ConstraintValidator<A, String>

This example class FilterValidator 310 extends an Annotation class (e.g., provided by java.lang.annotation.Annotation) and implements an interface Constraint Validator (e.g., provided by java.validation.ConstraintValidator), where String is the input string to be parsed (e.g., the JSON text from the query request 108). FieldValidator 310 acts as a main entry point for the validator engine 120.

In the example embodiment, FieldValidator 310 defines several methods, including isValid 312, validate Query 314, validateItem 316, and various data type-specific validator methods 318, as well as a class getPropertyType 322 that includes a method validateOperator 320. The method isValid 312 is an outer method that is used to parse the JSON text (e.g., as in operation 210 of FIG. 2) and validate whether there are any errors in the enclosed triplets 222 through a call to method validate Query 314 (e.g., as in the loop of 220 of FIG. 2). The method validate Query 314 takes, as input from the parsing, the set of all triplets 222 (e.g., property 224, comparison operator 226, operand value 228 of FIG. 2), loops through each of the triplets 222 and validates each triplet through a call to method validateItem 316 (e.g., where "Item" refers to a triplet 222).

Within method validateItem 316, the method 316 branches to one of the particular type-specific validators 318 based on the data type of the current value 228. For example, the type-specific validators 318 may include methods for validating values of each particular data type, such as a numeric validator, a string validator, a Boolean validator, and a null validator. Each type-specific validator 318 gets the expected type of the current property 224 using class getPropertyType 322 and tries to parse the value 228 into the expected type, erroring if the data type 242 of the value 228 does not match the expected type (e.g., as in 242-254 of FIG. 2). Further, the type-specific validator 318 uses a method validateOperator 320 to determine whether the operator 326 is one of the eligible operators for the data type of the property 324 (e.g., as in 260-262 of FIG. 2).

The Java runtime environment 160 defines a class filterPropertiesValidator 330 that extends the class filter Validator 310 with an annotation @FilterProperties 332:
    public class FilterPropertiesValidator extends FilterValidator<FilterProperties>
@FilterProperties 332 is an annotation that defines a Property[ ] array that contains all of the properties that may appear in query requests 108 (e.g., as in operation 212). For example:
    @Target({ElementType.PARAIVIETER})
    @Retention(RetentionPolicy.RUNTIME)
    @Constraint
        (validatedBy={FilterPropertiesValidator.class})
    public @interface FilterProperties
The annotation @FilterProperties also includes a method filterProperties 334 that returns the property to type mapping for a given property 224.

The Java runtime environment 160 also defines a class filterClassValidator 340 that extends the class filterValidator 310 with an annotation @FilterClass 342:
    public class FilterClassValidator extends FilterValidator<FilterClass>
and where @FilterClass 342 is an annotation defined as:
    @Target({ElementType.PARAIVIETER})
    @Retention(RetentionPolicy.RUNTIME)
    @Constraint
        (validatedBy={FilterPropertiesValidator.class})
    public @interface FilterProperties
The annotation @FilterClass 342 also includes a method filterClass 334 that returns an array of model classes from which the mapping can be derived. For example, the @FilterClass 342 annotation may include:
    Class<?>[ ] filterClassesQ;
through which the property to type map can be established and used to derive the property to type. While not shown in FIG. 3, the annotation @FilterClass 342 may also include a method unsupportedProperties( ) that returns an array of property names that are removed from mapping after the mapping is created from the class definitions. Such functionality prevents use of properties that are not stored in the database or are computed from other properties outside of the database. Further, both annotations @FilterProperties 332 and @FilterClass 342 may also contain a method continueOnUnknownField (not shown) that can be used to enable or disable strict validation (e.g., as for test 232 of FIG. 2). Strict validation means that validation fails if the query request 108 contains properties 224 that are not in the provided mapping. Both of these constraints are used on query parameter definitions in Java handler for the REST endpoint 122.

5. Application Process Overview—Conversion

Figure 4:
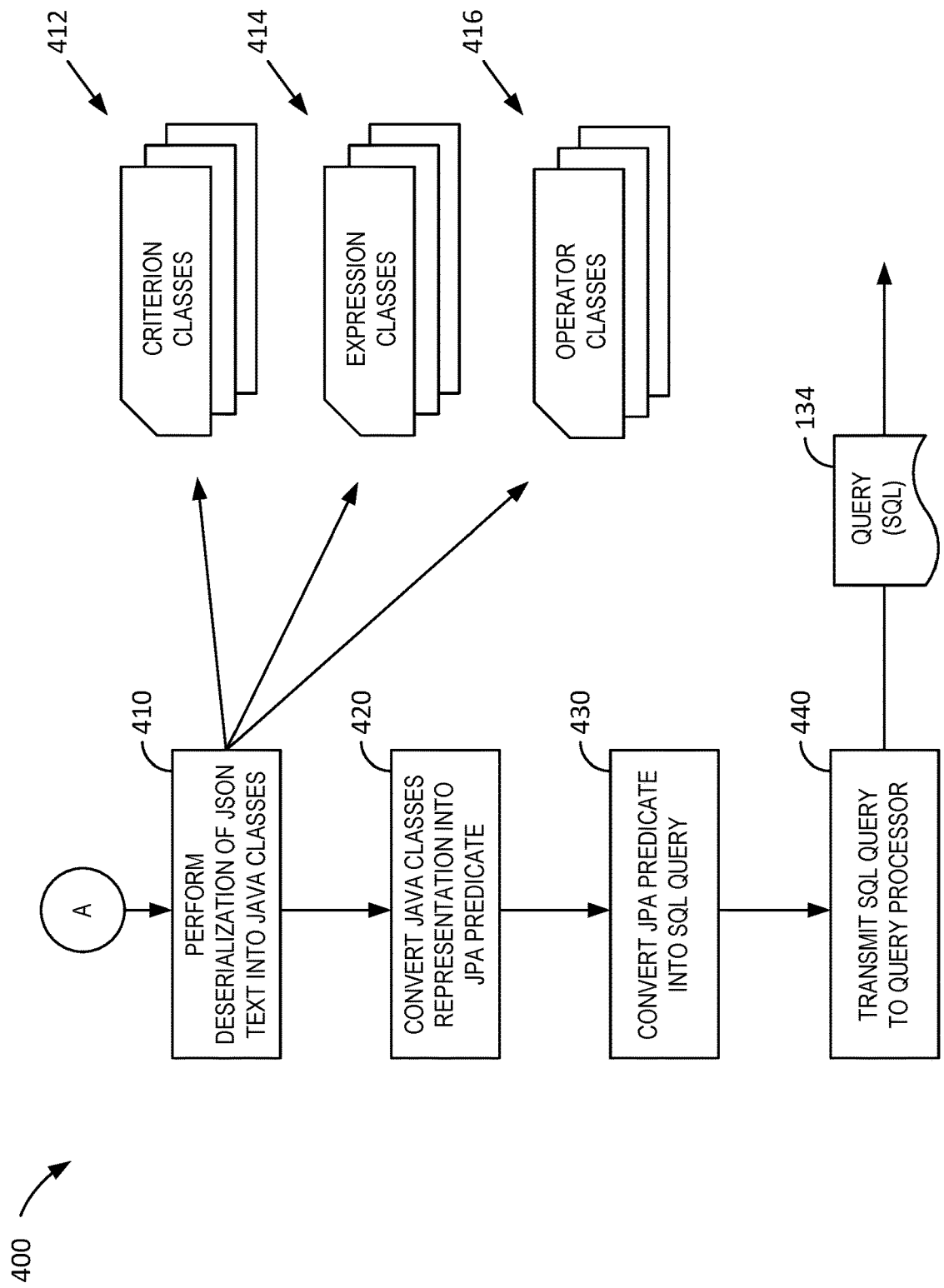
FIG. 4 is an example method for performing query conversion from the JSON query request to the SQL query shown in FIG. 1.

FIG. 4 is an example method 400 for performing query conversion from the JSON query request 108 to the SQL query 134 shown in FIG. 1. In the example embodiment, the method 400 is performed by the conversion engine 130 using JPA 132. At operation 410, the conversion engine 130 performs deserialization of the JSON text from query request 108 into Java classes. The conversion engine 130 uses the grammar shown in Table 1 to translate the JSON text into various java classes. More specifically, the conversion engine 130 creates three categories of classes: criterion classes 412, expression classes 414, and operator classes 416.

For example, criterion classes 412 include classes DBQueryRoot (e.g., a model class to store ROOT CRITERION) and DBQuery (e.g., a model class to store CRITERION). Expression classes 414 include classes BooleanExpressionitem (e.g., a model class to represent expressions that use one Boolean value for comparison), NullExpressionitem (e.g., a model class to represent expressions that compare to nullable value), NumberExpressionitem (e.g., a model class to represent expressions that compare one numeric value), StringExpressionitem (e.g., a model class to represent expressions that compare one string value), StringDerivableExpressionitem (e.g., a model class to represent expressions that compare one value of the type that is derivable from string value), ListNumberExpressionitem (e.g., a model class to represent expressions that compare with multiple numeric values), ListStringExpressionitem (e.g., a model class to represent expressions that compare with multiple string values), and ListStringDerivableExpressionitem (e.g., a model class to represent expressions that compare with multiple values of a type that is derivable from string). Operator classes 416 include classes ComparisonOperator (e.g., enumeration representing comparison operators from SINGLE_VAL_OPERATOR and ARRAY_VAL_OPERATOR) and LogicalOperator (e.g., enumeration representing logical operators from LOGICAL_OPERATOR).

Each of these classes 412-416 correspond to the implementation of the query request 108 that is written in JSON text. JSON supports Boolean, number, string, object, and array values for the keys. In the EXPRESSION, only Boolean, number, string, and arrays are used. To perform the deserialization, a recursive descent parser (not separately shown) creates objects of criterions and expressions from the JSON text. Since the structure of the data that the query request 108 references is known, the conversion engine 130 is aware of the expected data type of each value from the keys. To get the type for the property, Java reflection is used in a case of low-level data processing. Here, the Jackson library (a JSON processor for Java, e.g., Jackson ObjectMapper, promulgated via GitHub at https://github.com/FasterXML/jackson) provides high level introspection of Java classes. Knowing the expected type for the value in the expression allows the conversion engine 130 to directly deserialize the JSON string value if the type is derivable from the string.

At operation 420, the conversion engine 130 converts the Java classes representation derived from operation 410 into a JPA predicate. To convert the CRITERIONs stored in the model classes, the conversion engine 130 uses an instance of CriteriaBuilder to create and construct criteria queries, expressions, and predicates. The instance may be obtained from an instance of EntityManager, which is an interface to interact with persistence context. The EntityManager is created from EntityManagerFactory. EntityManagerFactory creates instances of EntityManager based on a predetermined configuration.

Once the instance of CriteriaBuilder is established, the conversion engine 130 defines a root for the query 108 (e.g., an entity class whose instances we want to retrieve from the database). Having this root, the conversion engine 130 defines the predicate for each expression and/or logical operators. For example, logical operators are converted as:
  $and—CriteriaBuilder #and
  $or—CriteriaBuilder #or
  $nor—CriteriaBuilder #nor
  $not—CriteriaBuilder #not
Comparison operators are converted as:
  $eq—CriteriaBuilder #equal (e.g. in case of comparison with non-null value)
  $eq—CriteriaBuilder #isNull (e.g., in case of null value)
  $ne—CriteriaBuilder #notEqual (e.g., in case of comparison with non-null value)
  $ne—CriteriaBuilder #isNotNull (e.g., in case of non-null values)
  $in—CriteriaBuilder #in
  $nin—negation of CriteriaBuilder #in
  $gt—CriteriaBuilder #gt (e.g., when type of the value is number)
  $gt—CriteriaBuilder #greaterThan (e.g., when type supports the $gt operator and is derived from string)
  $gte—CriteriaBuilder #ge (e.g., when type is number)
  $gte—CriteriaBuilder #greaterThanOrEqualTo (e.g., when type supports the $gte operator and is derived from string)
  $lt—CriteriaBuilder #lt (e.g., when type of value is number)
  $lt—CriteriaBuilder #lessThan (e.g., when type supports the $lt operator and is derived from string)
  $lte—CriteriaBuilder #lte (e.g., when type of value is number)
  $lte—CriteriaBuilder #lessThanOrEqualTo (e.g., when type supports the $lte operator and is derived from string)

At operation 430, the conversion engine 130 converts the JPA predicate into the SQL query 134. The JPA predicate can be passed to the where method in the CriteriaQuery. Additionally, more conditions can be added (e.g., for pagination) and clauses for ordering the results. JPA generates the appropriate SQL for the SQL query 134, thus protecting the SQL generation from certain security vulnerabilities. At operation 440, the conversion engine 130 transmits the SQL query 134 to the query processor 140 for processing, as shown in FIG. 1.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field-programmable gate arrays (FPGAs), or network processing units (NPUs) that are persistently programmed to perform the techniques, or may include one or more hardware processors programmed to perform the techniques pursuant to program instructions in firmware, memory, other storage, or in combination. Such special-purpose computing devices may also combine custom hardware-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 5:
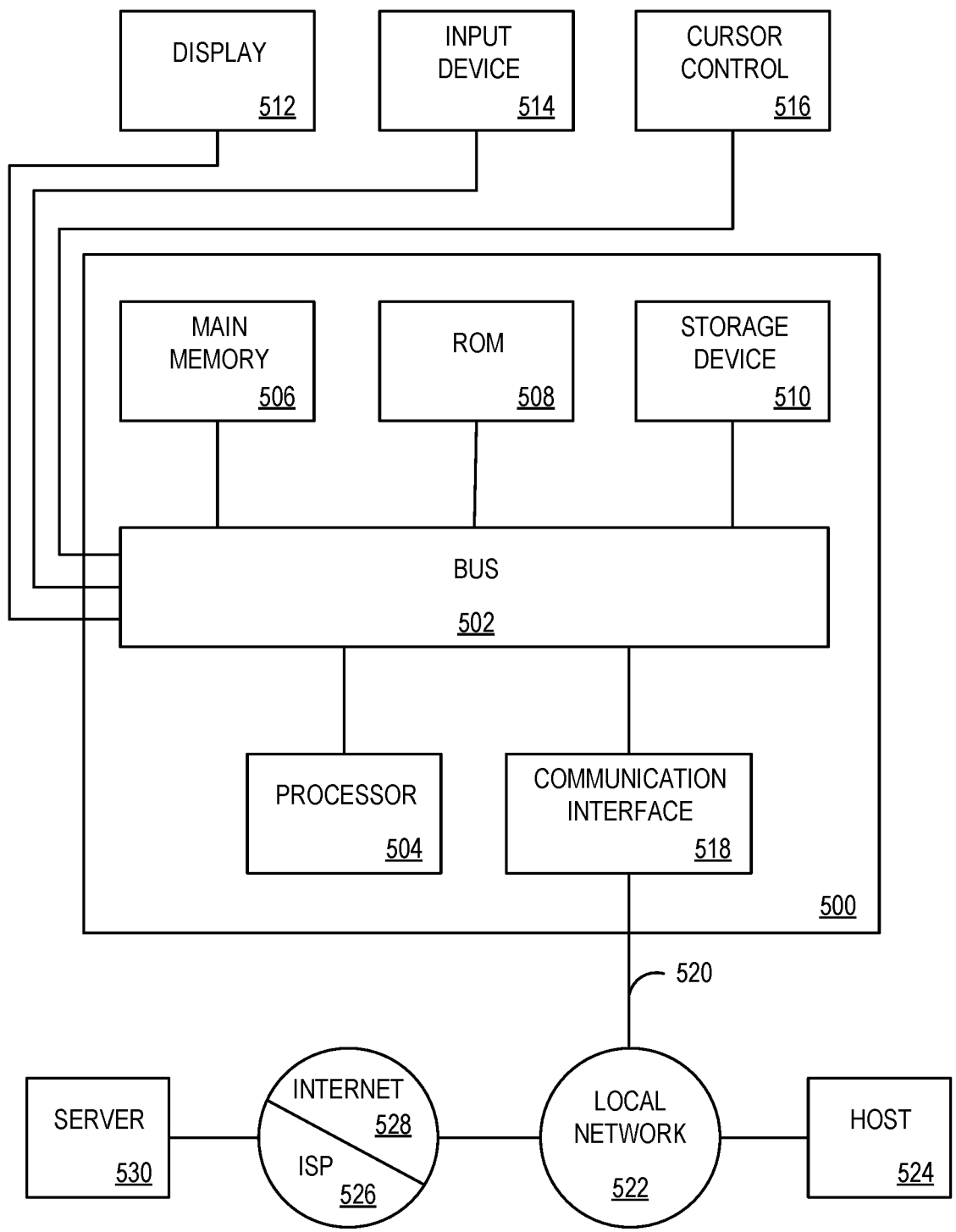
FIG. 5 is a block diagram that illustrates a computer system 500 upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a central processing unit (CPU) microprocessor.

Computer system 500 also includes a main memory 506 such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire, and fiber optics, including the wires that comprise bus 502. Transmission media can also take the form of acoustic or light waves, such as those generated during radio-wave and infra-red data communications.

Various forms of media may be involved in carrying one or more instructions to processor 504 for execution. For example, the instructions may initially be carried on a magnetic disk or solid state drive of a remote computer. The remote computer can load the instructions into the remote computer's dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520, and communication interface 518. In the Internet example, a server 530 might transmit a requested code for an application program through Internet 528, ISP 526, local network 522, and communication interface 518. The received code may be executed by processor 504 as the code is received, and/or stored in storage device 510, or other non-volatile storage for later execution.

7. Integrated Method for Verification and Conversion

Figure 6:
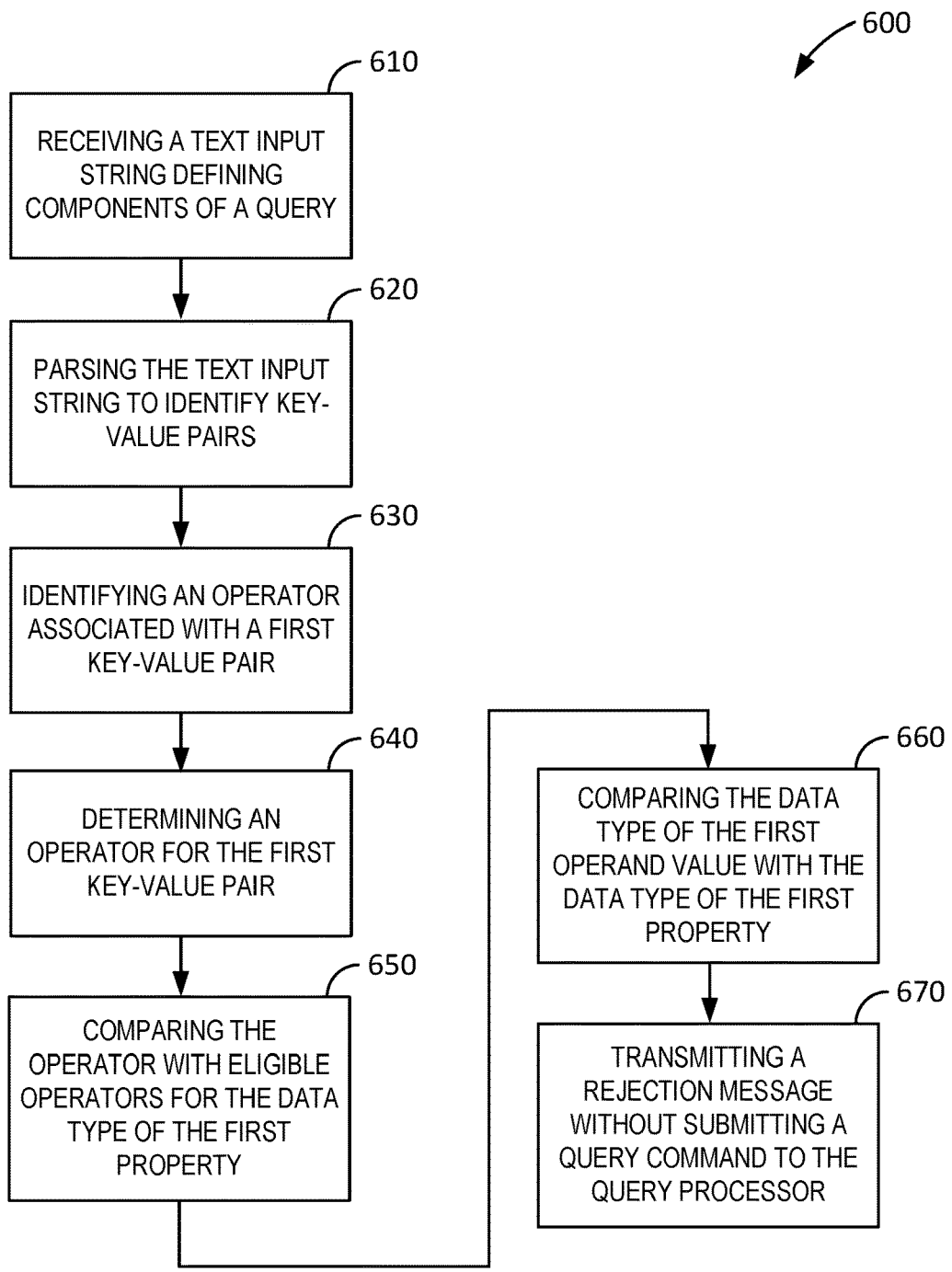
FIG. 6 is a flow chart of an example method for performing verification on, and conversion of, a query request.

FIG. 6 is a flow chart of an example method 600 for performing verification on, and conversion of, a query request. In the example embodiment, the method 600 is performed by the validator engine 120 and the conversion engine 130 shown in FIG. 1. In some embodiments, the method 600 includes steps similar to those of method 200 in FIG. 2, method 400 in FIG. 4, and uses the Java runtime environment 160 of FIGS. 1 and 3, and may be executed using one or more computer systems 500 shown in FIG. 5.

Method 600, in the example embodiment, includes receiving a text input string defining components of a select query for a database in a first representation, the first representation being different than a query syntax of a query processor associated with the database (operation 610). In some embodiments, the first representation of the text input string is formatted in JavaScript Object Notation (JSON). The method 600 includes parsing the text input string to identify a set of key-value pairs that define portions of a "where" clause for the select query (operation 620). The set of key-value pairs includes a first key-value pair, and the first key-value pair includes at least a first property and a first operand value. In some embodiments, parsing the text input string includes performing descent parsing on the text input string to identify a plurality of expression components from the text input string. The method 600 further identifying an operator associated with the first key-value pair (operation 630) and determining a data type of the first operand value (operation 640). In some embodiments, identifying an operator associated with the first key-value pair includes inferring an equality operator for the first key-value pair when an operator is not provided.

In the example embodiment, the method 600 also includes comparing the operator with a predefined set of eligible operators defined for a data type of the first property (operation 650) and comparing the data type of the first operand value with the data type of the first property (operation 660). The method 600 further includes transmitting a rejection message to the requesting device without submitting a query command to the query processor of the database for the select query when, based on the comparisons, one or more of (i) the operator is not within the predefined set of eligible operators and (ii) the data type of the first operand value does not match the data type of the first property (operation 670). In some embodiments, transmitting a rejection message to the requesting device is further configured generate a Jakarta Persistence API (JPA) predicate based on the parsing of the set of key-value pairs when no error is detected in the text input string, and the method 600 further generating an SQL query based at least in part on the JPA predicate, and transmitting the SQL query to the query processor for execution.

In some embodiments, the method 600 also includes comparing the first property to a list of pre-defined property names and transmitting the rejection message additionally when (iii) the first property is not included in the list of pre-defined property names. In some embodiments, the method 600 includes establishing a Java runtime environment that utilizes Java annotations, wherein the list of pre-defined property names are established by an annotation, wherein comparing the first property to the list of pre-defined property names includes accessing the list of pre-defined property names via the annotation.

In some embodiments, the method 600 includes establishing a Java runtime environment that utilizes Java annotations, wherein the Java runtime environment establishes an annotation that includes an array of classes where each class of the array of classes is associated with a property of the database and define a data type associated with that property, and determining a data type of the first property using the annotation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A database management system comprising:
    a memory storing a database that includes at least a structured component, the structured component defines at least a field name and a data type for each data field defined by the structured component;
    a query processor configured to generate query output from a database in response to query commands formatted in a native query syntax; and
    a query validator configurable to conditionally reject query requests prior to submission to the query processor, the query validator comprising at least one processor executing instructions that are configured to cause the at least one processor to:
        receive, from a requesting device, a text input string defining components of a source operation that includes a select query for the database in a first representation, the first representation being different than a native query syntax of the database;
        parse, from the text input string, a set of key-value pairs that define search filter conditions of the select query, the set of key-value pairs includes a first key-value pair, the first key-value pair includes at least a first property and a first operand value;
        identify an operator associated with the first key-value pair;
        determine a data type of the first operand value;
        pre-condition a validation of the operator and the first operand value for the first property using one or more Java annotations to determine a data type of the first property based on a plurality of stored properties, a plurality of stored data types for the plurality of stored properties, and a predefined set of one or more eligible operators defined for the data type of the first property; wherein a first method of the one or more Java annotations is used to determine the data type of the first property and a second method of the one or more Java annotations is used to determine the predefined set of one or more eligible operators defined for the data type of the first property;
        perform the validation of the operator and the first operand value for the first property at least in part by:
            comparing the operator with the predefined set of one or more eligible operators defined for the data type of the first property;
            comparing the data type of the first operand value with the data type of the first property; and
        cause a first destination operation that includes at least a first structured query language (SQL) query to be created and transmitted to the query processor for execution when (i) the operator is determined to be within the predefined set of one or more eligible operators and (ii) the data type of the first operand value is determined to match the data type of the first property.

2. The database management system of claim 1, wherein the instructions are further configured to cause the at least one processor to cause one or more additional destination operations to be performed in response to receipt of the source operation, wherein results from the first destination operation and the one or more additional destination operations are combined to provide query output for the source operation.

3. The database management system of claim 1, wherein the instructions are further configured to cause the at least one processor to transmit a rejection message to the requesting device without submitting a query command to the query processor of the database for a given select query when one or more of (i) a given operator is not within a determined predefined set of eligible operators and (ii) a given data type of a given operand value does not match a determined data type of a given property.

4. The database management system of claim 3, wherein the instructions are further configured to cause the at least one processor to:
    compare the first property to a list of pre-defined property names; and
    transmit the rejection message additionally when (iii) the first property is not included in the list of pre-defined property names.

5. The database management system of claim 4, wherein the query validator establishes a Java runtime environment that utilizes Java annotations, wherein the list of pre-defined property names are established by an annotation, wherein comparing the first property to the list of pre-defined property names includes accessing the list of pre-defined property names via the annotation.

6. The database management system of claim 1, wherein the query validator establishes a Java runtime environment that utilizes Java annotations, wherein the Java runtime environment establishes an annotation that includes an array of classes where each class of the array of classes is associated with a property of the database and define a data type associated with that property, wherein the instructions are further configured to determine a data type of the first property using the annotation.

7. The database management system of claim 1, wherein causing a first destination operation is configured to generate a Jakarta Persistence API (JPA) predicate based on the parsing of the set of key-value pairs when no error is detected in the text input string, wherein the instructions further cause the at least one processor to:
    generate a structured query language (SQL) query based at least in part on the JPA predicate; and
    transmit the SQL query to the query processor for execution.

8. A computer-implemented method comprising:
    receiving a text input string defining components of a source operation that includes a select query for a database in a first representation, the first representation being different than a query syntax of a query processor associated with the database;
    parsing the text input string to identify a set of key-value pairs that define portions of a where clause for the select query, the set of key-value pairs includes a first key-value pair, the first key-value pair includes at least a first property and a first operand value;

identifying an operator associated with the first key-value pair;

determining a data type of the first operand value;

pre-conditioning a validation of the operator and the first operand value for the first property using one or more Java annotations to determine a data type of the first property based on a plurality of stored properties, a plurality of stored data types for the plurality of stored properties, and a predefined set of one or more eligible operators defined for the data type of the first property; wherein a first method of the one or more Java annotations is used to determine the data type of the first property and a second method of the one or more Java annotations is used to determine the predefined set of one or more eligible operators defined for the data type of the first property;

performing the validation of the operator and the first operand value for the first property at least in part by:

comparing the operator with the predefined set of one or more eligible operators defined for the data type of the first property;

comparing the data type of the first operand value with the data type of the first property; and creating and transmitting, to the query processor for execution, a first destination operation that includes at least a first structured query language (SQL) query when (i) the operator is determined to be within the predefined set of one or more eligible operators and (ii) the data type of the first operand value is determined to match the data type of the first property.

9. The computer-implemented method of claim 8, further comprising creating and transmitting, to the query processor for execution, one or more additional destination operations to be performed in response to receipt of the source operation, wherein results from the first destination operation and the one or more additional destination operations are combined to provide query output for the source operation.

10. The computer-implemented method of claim 8, further comprising transmitting a rejection message to a requesting device without submitting a query command to the query processor of the database for a given select query when, based on comparisons, one or more of (i) a given operator is not within a determined predefined set of eligible operators and (ii) a given data type of a given operand value does not match a determined data type of a given property.

11. The computer-implemented method of claim 10, further comprising:

comparing the first property to a list of pre-defined property names; and transmitting the rejection message additionally when (iii) the first property is not included in the list of pre-defined property names.

12. The computer-implemented method of claim 11, further comprising establishing a Java runtime environment that utilizes Java annotations, wherein the list of pre-defined property names are established by an annotation, wherein comparing the first property to the list of pre-defined property names includes accessing the list of pre-defined property names via the annotation.

13. The computer-implemented method of claim 8, further comprising:

establishing a Java runtime environment that utilizes Java annotations, wherein the Java runtime environment establishes an annotation that includes an array of classes where each class of the array of classes is associated with a property of the database and define a data type associated with that property; and determining a data type of the first property using the annotation.

14. The computer-implemented method of claim 8, wherein causing a first destination operation is configured to generate a Jakarta Persistence API (JPA) predicate based on the parsing of the set of key-value pairs when no error is detected in the text input string, the computer-implemented method further comprising:

generating a structured query language (SQL) query based at least in part on the JPA predicate; and transmitting the SQL query to the query processor for execution.

15. A non-transitory, computer-readable medium storing instructions that, when executed by at least one processor, cause the at least one processor to:

receive, from a requesting device, a text input string defining components of a source operation that includes a select query for a database in a first representation, the first representation being different than a native query syntax of the database;

parse, from the text input string, a set of key-value pairs that define search filter conditions of the select query, the set of key-value pairs includes a first key-value pair, the first key-value pair includes at least a first property and a first operand value;

identify an operator associated with the first key-value pair;

determine a data type of the first operand value;

pre-conditioning a validation of the operator and the first operand value for the first property using one or more Java annotations to determine a data type of the first property based on a plurality of stored properties, a plurality of stored data types for the plurality of stored properties, and a predefined set of one or more eligible operators defined for the data type of the first property; wherein a first method of the one or more Java annotations is used to determine the data type of the first property and a second method of the one or more Java annotations is used to determine the predefined set of one or more eligible operators defined for the data type of the first property;

perform the validation of the operator and the first operand value for the first property at least in part by:

comparing the operator with the predefined set of one or more eligible operators defined for the data type of the first property;

comparing the data type of the first operand value with the data type of the first property; and cause a first destination operation that includes at least a first structured query language (SQL) query to be created and transmitted to a query processor for execution when (i) the operator is determined to be within the predefined set of one or more eligible operators and (ii) the data type of the first operand value is determined to match the data type of the first property.

16. The non-transitory, computer-readable medium of claim 15, wherein the instructions are further configured to cause the at least one processor to cause one or more additional destination operations to be performed in response to receipt of the source operation, wherein results from the first destination operation and the one or more additional destination operations are combined to provide query output for the source operation.

17. The non-transitory, computer-readable medium of claim 15, wherein the instructions are further configured to cause the at least one processor to transmit a rejection message to the requesting device without submitting a query command to a query processor of the database for a given select query when one or more of (i) a given operator is not within a determined predefined set of eligible operators and (ii) a given data type of a given operand value does not match a determined data type of a given property.

18. The non-transitory, computer-readable medium of claim 17, wherein the instructions are further configured to cause the at least one processor to:
compare the first property to a list of pre-defined property names; and
transmit the rejection message additionally when (iii) the first property is not included in the list of pre-defined property names.

19. The non-transitory, computer-readable medium of claim 18, wherein the instructions further cause the at least one processor to establish a Java runtime environment that utilizes Java annotations, wherein the list of pre-defined property names are established by an annotation, wherein comparing the first property to the list of pre-defined property names includes accessing the list of pre-defined property names via the annotation.

20. The non-transitory, computer-readable medium of claim 15, wherein causing a first destination operation is configured to generate a Jakarta Persistence API (JPA) predicate based on the parsing of the set of key-value pairs when no error is detected in the text input string, wherein the instructions further cause the at least one processor to:
generate a structured query language (SQL) query based at least in part on the JPA predicate; and
transmit the SQL query to the query processor for execution.

\* \* \* \* \*

UNITED STATES PATENT AND TRADEMARK OFFICE
CERTIFICATE OF CORRECTION

| | | |
|---|---|---|
| PATENT NO. | : 12,332,885 B2 | Page 1 of 1 |
| APPLICATION NO. | : 17/938574 | |
| DATED | : June 17, 2025 | |
| INVENTOR(S) | : Bzoch | |

It is certified that error appears in the above-identified patent and that said Letters Patent is hereby corrected as shown below:

On the Title Page

On page 2, Column 2, item (56) under Other Publications, Line 16, delete "lava" and insert -- java --.

In the Drawings

On sheet 3 of 6, in FIG. 3, under reference numeral 316, Line 2, delete "validateltem" and insert -- validateItem --, therefor.

In the Specification

In Column 12, Line 55, delete "validateltem" and insert -- validateItem --, therefor.

In Column 12, Line 66, delete "validateltem" and insert -- validateItem --, therefor.

In Column 13, Line 1, delete "validateltem" and insert -- validateItem --, therefor.

Signed and Sealed this
Fourteenth Day of October, 2025

John A. Squires
*Director of the United States Patent and Trademark Office*